Figure 1A:
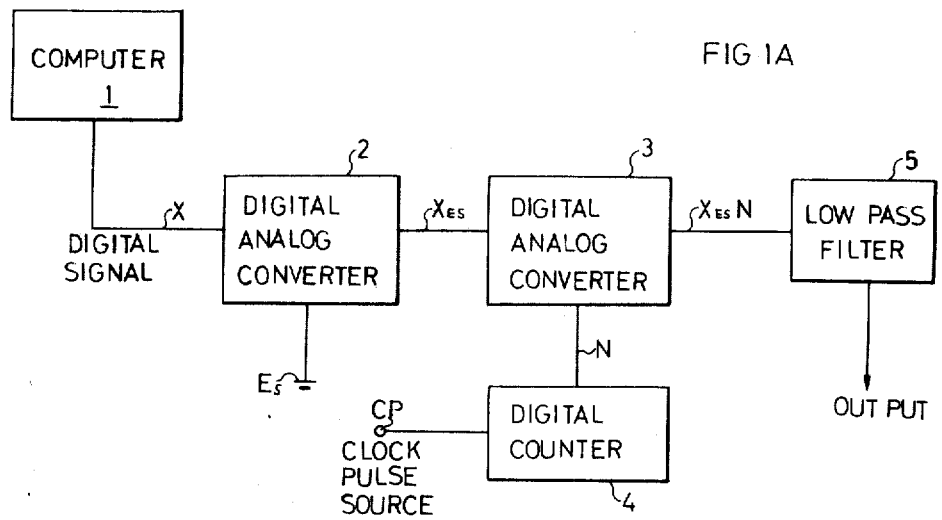

United States Patent
Tada

[15] 3,659,282
[45] Apr. 25, 1972

[54] GRAPHIC DISPLAY

[72] Inventor: Yasuo Tada, c/o Iwasaki Tsushinki Kabushiki Kaisha, 710, Kugayama 2-chome, Suginami-ku, Tokyo, Japan

[22] Filed: Dec. 11, 1968

[21] Appl. No.: 783,050

[30] Foreign Application Priority Data

Dec. 20, 1967 Japan..................................42/81139
Dec. 20, 1967 Japan..................................42/81140

[52] U.S. Cl. .........................340/324 A, 315/18, 340/172.5
[51] Int. Cl. ..............................................G06f 3/14
[58] Field of Search..............................................340/324.1

[56] References Cited

UNITED STATES PATENTS

| | | | |
|---|---|---|---|
| 3,333,147 | 7/1967 | Henderson | 340/324 X |
| 3,335,415 | 8/1967 | Conway et al. | 340/324 |
| 3,335,416 | 8/1967 | Hughes | 340/324 |
| 3,311,908 | 3/1967 | Halsted et al. | 340/324 A |
| 3,320,409 | 5/1967 | Larrowe | 340/324 A X |
| 3,325,802 | 6/1967 | Bacon | 340/324 A |

Primary Examiner—David L. Trafton
Attorney—Robert E. Burns and Emmanuel J. Lobato

[57] ABSTRACT

A pair of input signals corresponding to X and Y coordinate information are processed and simultaneously applied at certain time intervals to a display system, and the points represented by said pair of input signals are successively connected by straight lines. In a first embodiment of the signal processing, wherein the input signals and digital signals, such input signals are applied to a first digital analog converter for converting the digital signals into related quantum analog voltages whereupon the quantum voltages are applied to a second digital analog converter which effectively adds the quantum voltages. The output of the second converter is impressed upon a CRT display of the oscilloscope or an XY recorder, thereby tracing a figure on the display or recorder. Alternatively, the first digital analog converter can be replaced by an analog attenuator for converting analog input signals into related analog quantum voltages which are then processed the same as in the above-mentioned first embodiment. Thus, very accurate coordinate presentations can be traced on a CRT display of the oscilloscope or an XY recorder.

11 Claims, 10 Drawing Figures

GRAPHIC DISPLAY

The present invention relates to an improved graphic display method for displaying an output of a digital processing system, or an analog processing system such as an electronic computer, upon a CRT display or an analog XY recorder. The output of such a system is usually a pair of digital signals or analog voltages, which will be stated hereafter as "X and Y input signals." In case of digital systems the X and Y input signals are of digital form, but in case of analog systems they are of analog form. Usually the latter signals are displayed by an analog method, which makes it difficult to maintain the display accurately. In this present invention digital input signals as well as analog input signals are displayed at a high accuracy by means of a digital technique.

The conventional display method of this kind consists of displaying the graph by a locus of a series of (X, Y) co-ordinate points which represent the X and Y input signals. However, in the conventional manner of displaying X and Y digital input signals, a definite and constant voltage was used as the quantum voltage and the unit voltage was multiplied by X or Y to obtain an analog voltage, so that the variation in voltage was not proportional to the lapse of displaying time resulting in failure in the provision of a fine and smooth graphic display.

The method of the present invention includes applying an analog conversion to a digital signal for defining a graph on a display, using the converted digital signal as a quantum voltage and applying an analog conversion to this quantum voltage by a digital to analog converter so as to acquire a smooth analog voltage varying with time. By using such a smooth analog voltage varying with time as an input, it is feasible to draw figures which conform to the required figures on a CRT display or on an X, Y-recorder.

Further features and advantages of the present invention will be apparent from the ensuing description with reference to the accompanying drawings to which, however, the scope of the invention is in no way limited.

Figure 1B:
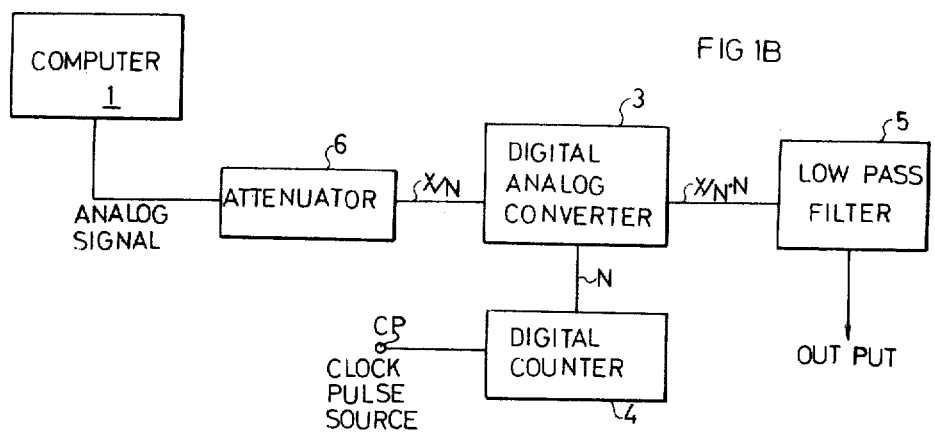
Figure 2A:
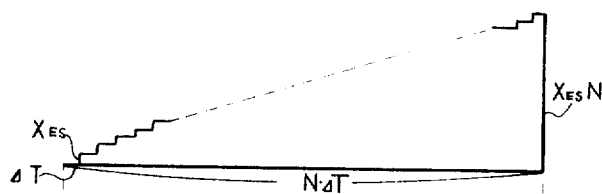
Figure 2B:
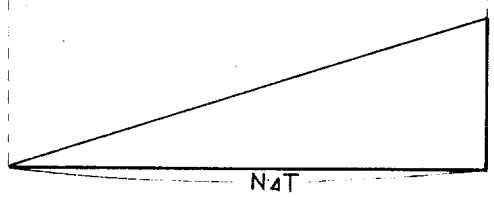
Figure 3:
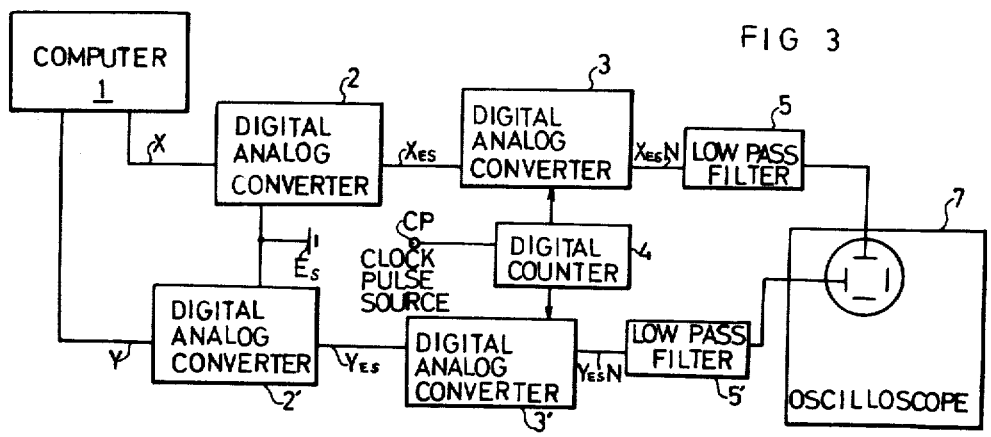
Figure 4:
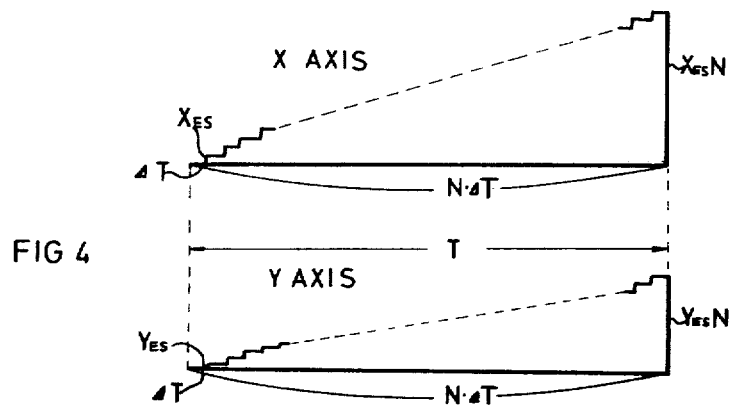
Figure 5:
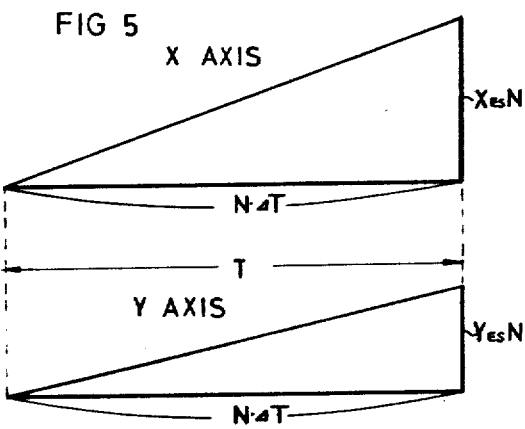
Figure 6:
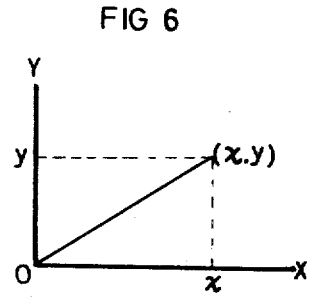
Figure 7:
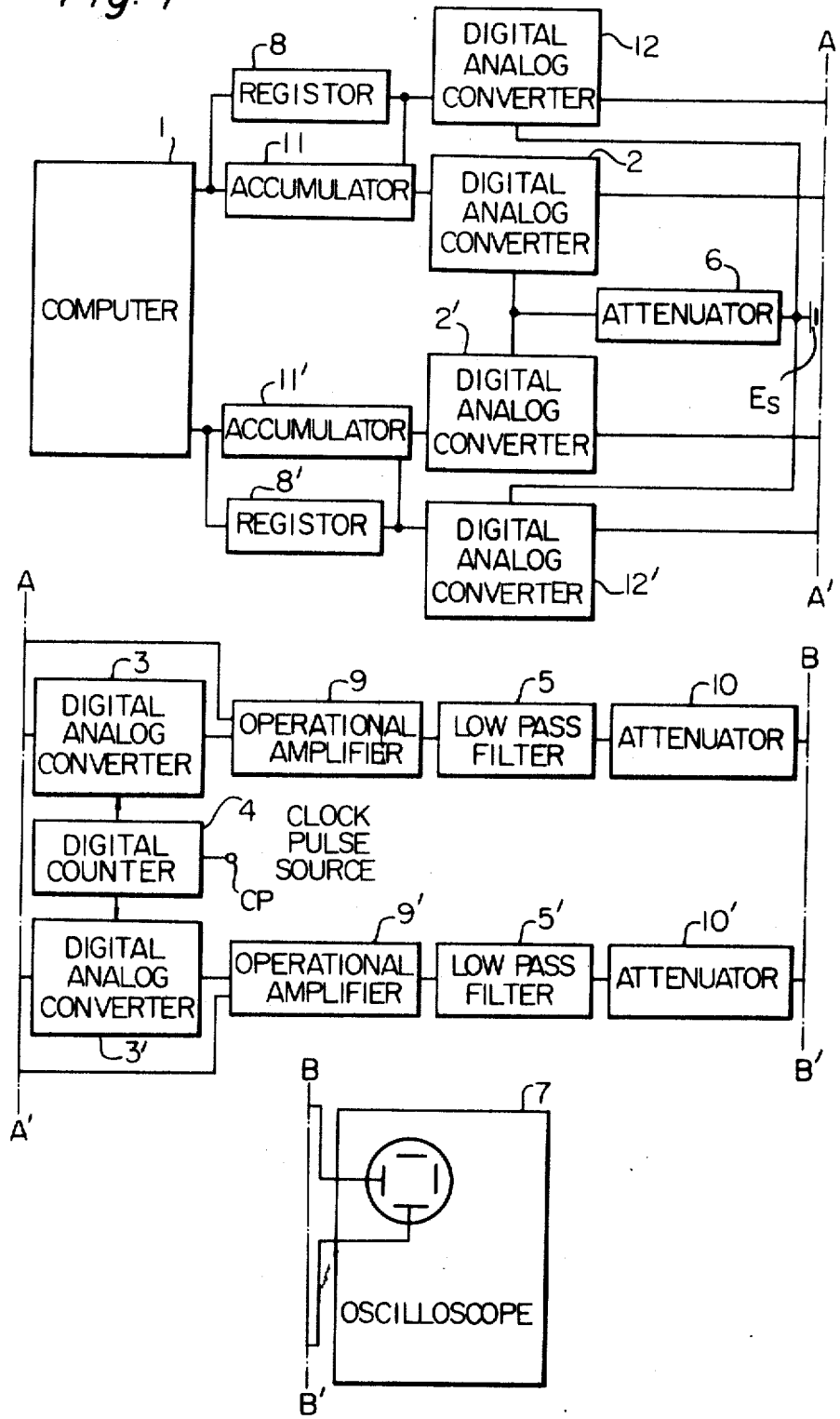
Figure 8:
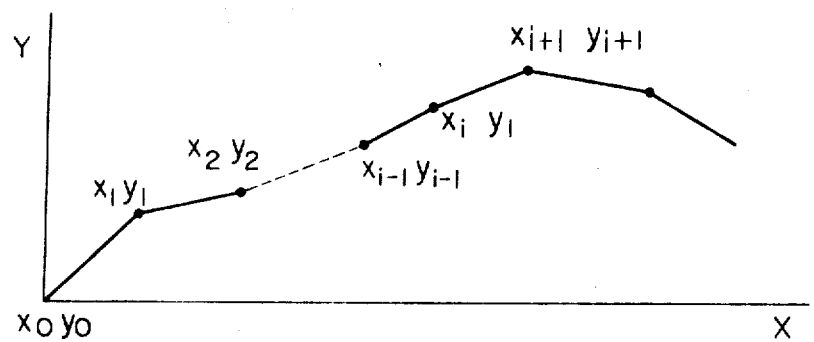

FIGS. 1A and 1B are block diagrams for showing a method for converting an input signal into an analog voltage, FIGS. 2A and 2B are explanatory drawings of a waveform of the output obtained by the method shown in FIG. 1, FIG. 3 is a block diagram for showing a method for drawing a graph from a digital voltage of the by an analog voltage, FIG. 4 is an explanatory drawing of a waveform of the output obtained by the method shown in FIG. 3, FIG. 5 is an explanatory drawing of a waveform made by improving the linearity of the waveform of FIG. 4, FIG. 6 shows a waveform obtained on a display of an oscilloscope by the method of one embodiment of the present invention, FIG. 7 is a block diagram for showing another embodiment of the present invention, and FIG. 8 is an explanatory drawing of the operation of the method shown in FIG. 7.

When a value of the X coordinate is given in FIG. 1A by a digital output signal of the computer 1, the X coordinate is analog converted into a voltage $X_{ES}$ which is a function of the digital signal representing X by the reference voltage ES of a digital analog converter 2. In the ensuing description, whenever an analog voltage is described as being "a function of" a digital voltage, it should be understood to mean that the analog voltage is proportional to a value represented by the digital signal. This voltage $X_{ES}$ is supplied to a digital analog converter 3, not as the ordinary digital input voltage, but as a reference voltage for DA conversion. Next, a digital counter 4 counts certain constant rate clock pulses from a clock pulse source CP. Each counted pulse produces a digital unit "one." These ones are successively added in the digital counter 4, producing a series of digital signals such as 001, 010, 011, . . . , (or 1, 2, 3, . . . , N in decimal representation). This series is also given to the digital analog converter 3 as a digital input signal. N, the number of the pulses to be counted and added, determines the degree of resolution when drawing a straight line. The larger the value of N is taken, the smoother the displayed straight line is. Taking the value of N as 1,000 for instance, the counter 4 adds 1000 pulses and transmits a series of digital signals, 0000000001, 0000000010, . . . , 1111101000, to the digital analog converter 3 and repeats the counting. The length of the time T required for counting the N pulses is dependent upon the pulse rate and N. Suppose the pulse rate in the present case is 1,000,000 per second, or the pulse cycle is 1 micro second. $X_{ES}N$ the output of the digital analog converter 3, thus obtained, is a successive addition of the reference voltage $X_{ES}$ from $X_{ES}0$ to $X_{ES}N$ as is shown in FIG. 2A. The added voltage increases with time in a staircase fashion and reaches the desired final value $X_{ES}N$ at the end of the time duration T. Further, a smooth straight line, as shown in FIG. 2B, is obtained by passing the output of the digital analog converter 3 through a low pass filter 5 in order to eliminate the steps of the staircase waveform. In the case of the conventional method, wherein the reference voltage is always constant and the desired final voltage is obtained by properly determining the number of pulses, it was necessary to change the cut-off frequency of the low pass filter for eliminating the steps of the staircase, which was difficult to realize. While in the case of the present invention, the frequency per second of the clock pulse source CP is constant, so that each staircase step occurs at a constant time interval (in the said example, 1 micro second,) and the frequency characteristics of the low pass filter can be fixed. In the said example the frequency characteristic of this low pass filter may be such that a 1,000 $H_z$ wave is filtered out.

In case the input signal is given in the form of an analog signal, the digital analog converter 2 is not necessary, as shown in FIG. 1B. In this case, the given input analog voltage is attenuated by 1/N and converted into a quantum voltage by the attenuator 6. Thereafter, a smooth straight line voltage shown in FIG. 2B is obtained as in the aforementioned manner.

FIG. 3 shows how to draw a straight line from the origin to a certain point when the X and Y coordinates of the point are given on the coordinate plane of the CRT display of an oscilloscope 7. The output of the computer 1 is a digital signal and gives X, Y coordinates. The value of X is supplied to the digital analog converter 2 and the value of Y is supplied to the digital analog converter 2' in the form of a digital signal. Both of the digital analog converters 2 and 2' are connected to the unit voltage source ES and analog convert the digital signals X and Y into the quantum voltages $X_{ES}$ and $Y_{ES}$ (which are functions of digital signals X and Y, respectively. The unit voltages $X_{ES}$ and $Y_{ES}$), generated conventionally by the digital analog converters 2,2', are respectively supplied to the digital analog converters 3 and 3' as the reference voltages of DA conversion. As is aforementioned, suppose the pulse rate in the present case is 1,000,000 per second, or the pulse cycle is 1 micro second. The quantum voltages $X_{ES}$ and $Y_{ES}$, that is, the outputs of the digital analog converters 2 and 2' are successively added from $X_{ES}0$ to $X_{ES}N$, and from $Y_{ES}0$ to $Y_{ES}N$, as shown in FIG. 4. That is, the voltage varies with time and the lastly reached voltages are $X_{ES}N$ and $Y_{ES}N$ respectively. The outputs of the digital analog converters 3 and 3' are respectively given to the X and Y coordinate deflection plates of the oscilloscope 7 in the waveform shown in FIG. 4. The staircase waveforms of FIG. 4 are made straight by the filters 5 and 5' as shown in FIG. 5. When the waveform shown in FIG. 5 is coupled to the X and Y coordinate deflection plates of the oscilloscope 7, a smooth straight line is drawn from the original point to the point $(x, y)$ on the coordinates on the display of the oscilloscope as shown in FIG. 6. Provided that the time length of one cycle of the clock pulse of the clock pulse source CP is 1 $\mu$S and N is 1,000, the length of time required for drawing the straight line is equal to 1 ms. By the repetition of the aforementioned operations, 1,000 loci are given on the display of the oscilloscope within one second. Enlargement and contraction of the image obtained on the display can be carried out as required by adjusting the sensitivity of the oscilloscope. Enracy of the image because of the relatively small values of the quantum voltages $X_{ES}$ and $Y_{ES}$.

Further, in case of drawing a straight line from the location X, Y to another location on the display, the voltage corresponding to the location X, Y is stored in a register, the coordinate of the given location is added to this stored location XY and the result of the addition is given to the XY oscilloscope. The details of this procedure are explained as follows.

In FIG. 7, digital signals for designating X and Y come out of the computer 1 as time passes in the order of $x_0, y_0; x_1, y_1; x_2, y_2; \ldots x_i, y_i; x_{i+1}, y_{i+1}; \ldots x_n, y_n$; as shown in FIG. 8. The output signals $x_{i+1}, y_{i+1}$ from the computer 1 are supplied to accumulators 11 and 11', and the preceding value $x_i, y_i$ is stored to registers 8 and 8' in the form of a digital signal. In this case, as shown in FIG. 7, the output of the register is coupled as a second input to the accumulator which produces difference signals at its output, $\Delta x_i = x_i - x_{i+1}, \Delta y_i = y_i - y_{i+1}$, which are then supplied to the digital analog converters 2 and 2'. At the same time, the stored signals $x_i, y_i$ from the registers are supplied to operational amplifiers 9 and 9' by way of digital analog converters 12 and 12'. The output voltages of the digital analog converters 2 and 2' are supplied to operational amplifiers 9 and 9', by way of digital analog converters 3 and 3', in the aforementioned manner. In the operational amplifiers 9 and 9', locations stored on the registers 8 and 8' are added to the difference signal which move to the new locations. The output voltages of the operational amplifiers 9 and 9' are smoothed while passing through the low pass filters 5 and 5' and impressed upon the X and Y co-ordinates of the oscilloscope by way of the attenuators 10 and 10'. An attenuator 6 is also provided and is used to adjust the condition of the circuit, if necessary.

As already explained, in the method of the present invention, digital signals are analog converted into quantum voltages when locations on the co-ordinates are given in the form of a digital signals by the output of a computer, while analog converted into quantum voltages passing through attenuators when coordinates are given in the form of an analog signals. The quantum voltages thus obtained are multiplied by the number of the counter pulses, the analog converted voltages are impressed upon the X and Y coordinates of the CRT display and a smooth figure is drawn on the CRT display. Further, the coordinates are registered one by one and new locations are given on the coordinates, thereby eliminating accumulation of the errors.

While the invention has been described in conjunction with certain embodiments thereof, it is to be understood that various changes and modifications may be made without departing from the scope and spirit of the invention.

What is claimed is:

1. An improved method for providing a graphic display on an electrical display device by processing coordinate input information signals, corresponding to a line to be displayed, to obtain a output signal for application to said display device, comprising the steps of converting coordinate input information signals into first quantum voltages which are functions of said information signals, applying said quantum voltages to a first reference voltage input of a first digital analog converter, applying a series of clock pulses to an input to a digital counter for producing a series of digital pulses at an output of said counter, applying said output digital pulses to a second input of said digital analog converter, processing each of said quantum voltages by said series of output digital pulses within said digital analog converter to produce a varying quantum output signal for each said first quantum signal at an output of said digital analog converter, and coupling said quantum output signal to said electrical display device to produce said graphic display.

2. An improved method for providing a graphic display on an electrical display device as set forth in claim 1, further comprising the step of filtering said quantum output signal coupled to said display device by coupling a low pass filter between said first digital analog converter output and said graphic display device, and passing said quantum output signal coupled to said display device through said low pass filter.

3. An improved method for providing a graphic display on an electrical display device as set forth in claim 1, wherein said coordinate input information signals comprise digital coordinate signals, and wherein said step of converting said coordinate input information signals into quantum voltages is performed by applying said digital coordinate signals to a first input to a second digital analog converter and applying a second reference voltage to a second reference voltage input of said second digital analog converter to produce said first quantum voltages which are functions of said digital coordinate signals.

4. An improved method for providing a graphic display on an electrical display device as set forth in claim 3, further comprising the step of filtering said quantum output signal coupled to said display device by coupling a low pass filter between said first digital analog converter output and said graphic display device, and passing said quantum output signal coupled to said display device through said low pass filter.

5. An improved method for providing a graphic display on an electrical display device as set forth in claim 4, further comprising the step of attenuating the filtered quantum output signal by coupling an attenuator between said filter and display device, and passing said filtered quantum output signal coupled to said display device through said low pass filter.

6. An improved method for providing a graphic dis-play on an electrical display device as set forth in claim 4, further comprising the steps of passing said digital coordinate signals through an accumulator and register circuit to said second digital analog converter to store each said signal within said register for producing difference digital coordinate signals determined by each digital coordinate signal and its preceding said signal stored in said accumulator, applying said difference digital coordinate signals to said first input to said second digital analog converter, coupling register-output signals from an output of said register to an input of a third digital analog converter, and coupling an output of said third digital analog converter and said output of said first converter through an operational amplifier to said display device to add said preceding digital coordinate signal from said register to said output of said first digital analog converter output.

7. An improved method for providing a graphic display on an electrical display device as set forth in claim 6, further comprising the step of filtering said quantum output signal coupled to said display device by coupling a low pass filter between an output of said operational amplifier and said graphic display device, and passing said quantum output signal coupled to said display device through said low pass filter.

8. An improved method for providing a graphic display on an electrical display device as set forth in claim 7, further comprising the step of attenuating the filtered quantum output signal by coupling an attenuator between an output of said filter and said display device, and passing said filtered quantum output signal coupled to said display device through said attenuator.

9. An improved method for providing a graphic display on an electrical display device as set forth in claim 1, wherein said coordinate input information signals comprise analog coordinate signals, and wherein said step of converting said coordinate information signals into quantum voltages is performed by applying said analog coordinate signals to a first attenuator to produce said first quantum voltages proportional to said analog coordinate signals.

10. An improved method for providing a graphic display on an electrical display device as set forth in claim 9, further comprising the step of filtering said quantum output signal coupled to said display device by coupling a low pass filter between said first digital analog converter output and said graphic display device, and passing said quantum output signal coupled to said display device through said low pass filter.

11. An improved method for providing a graphic display on an electrical display device as set forth in claim 10, further comprising the step of attenuating the filtered quantum output signal by coupling a second attenuator between an output of said filter and said display device, and passing said filtered quantum output signal coupled to said display device through said attenuators.

* * * * *